(12) United States Patent
Farley

(10) Patent No.: US 6,270,023 B1
(45) Date of Patent: Aug. 7, 2001

(54) HAND HELD SHOWER HEAD WITH UNITARY FILTER HOUSING

(76) Inventor: David K. Farley, 1827 Capital St., Corona, CA (US) 91720

( * ) Notice: Subject to any disclaimer, the term of this patent is extended or adjusted under 35 U.S.C. 154(b) by 0 days.

(21) Appl. No.: 09/589,947

(22) Filed: Jun. 7, 2000

(51) Int. Cl.⁷ ............................. B05B 7/02; B05B 9/01; B05B 1/14; F23D 14/68
(52) U.S. Cl. ........................ 239/553.3; 239/525
(58) Field of Search ................... 239/525, 530, 239/315, 316, 310, 303, 308, 590, 590.5, 462, 548, 553, 556, 553.3; 210/264, 266

(56) References Cited

U.S. PATENT DOCUMENTS

| | | | |
|---|---|---|---|
| 4,151,957 | * 5/1979 | Gecewicz et al. | 239/381 |
| 4,394,965 | * 7/1983 | Backe et al. | 239/102 |
| 5,360,172 | * 11/1994 | Wang | 239/530 |
| 6,016,977 | 1/2000 | Farley . | |

* cited by examiner

Primary Examiner—David A. Scherbel
Assistant Examiner—Davis Hwu
(74) Attorney, Agent, or Firm—James G. O'Neill

(57) ABSTRACT

A combination hand held shower head and filter assembly for attachment to a waterline to remove chlorine and other substances from water. This assembly includes filter media held in a two-stage bed of ceramic-type calcium sulfite beads and a copper/zinc material in an internal chamber formed in an elongated, hollow handle. The combination elongated handle and filter assembly is held in a shower head having an angled portion threadably held on the combination elongated handle and filter assembly.

13 Claims, 1 Drawing Sheet

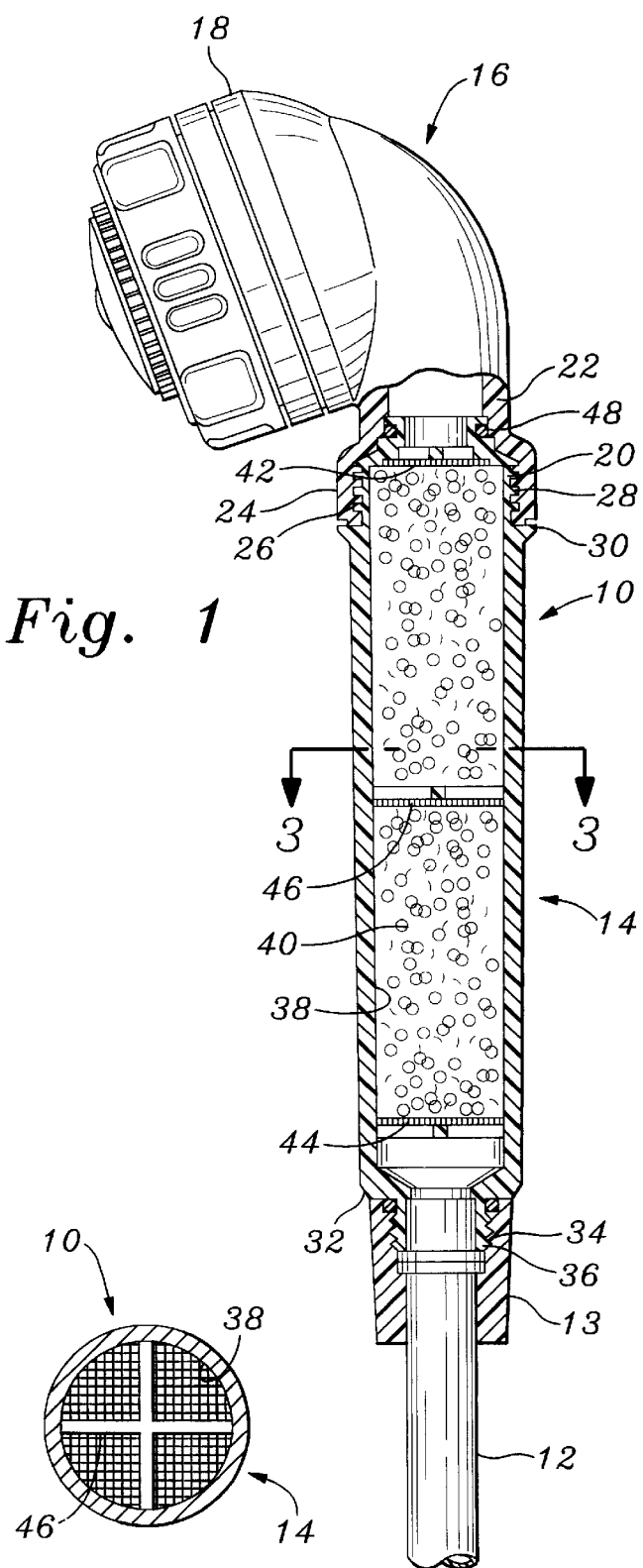
Fig. 1
Fig. 3
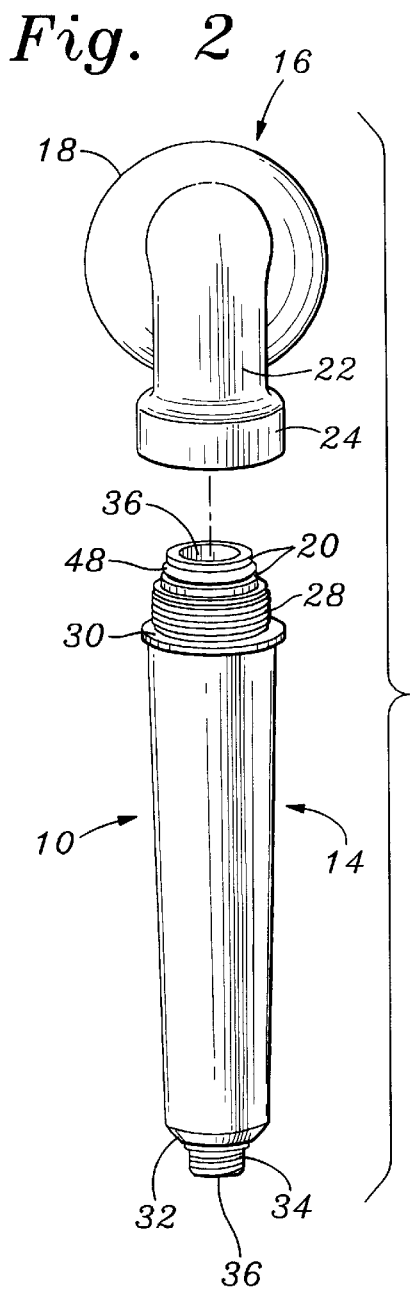
Fig. 2

HAND HELD SHOWER HEAD WITH UNITARY FILTER HOUSING

BACKGROUND OF THE INVENTION

1. Field of the Invention

This invention relates generally to devices for treating fluids and, more particularly, to a combination hand held shower head and unitary filter housing for the removal of unwanted contaminants, such as chlorine, from water.

2. Description of Related Art

My U.S. Pat. No. 6,016,977, issued Jan. 25, 2000, discloses a hand held shower dechlorinator with a reversible and reusable filter held in an elongated, hollow handle secured to a shower head.

While the foregoing prior art device provides improved filtration of water passing through it, the hand held handle must be removed, the filter cartridge removed from the handle and reversed or a new filter cartridge inserted therein. This is not always convenient, and the filter cartridge holds a limited amount of filter media, unless made very large, either in diameter or length. This would necessitate the lengthening or broadening of the hand held housing, thereby adding to the cost and difficulty in use thereof. Therefore, there exists a need in the art for an improved hand held shower head filter housing.

SUMMARY OF THE INVENTION

Accordingly, it is a general object of the present invention to provide an improved shower water filter. It is a particular object of the present invention to provide an improved hand held device for filtering contaminants from shower water. It is a still more particular object of the present invention to provide an improved combination hand held shower head and filter for filtering contaminants from hot water passing therethrough at high flow rates. It is yet a more particular object of the present invention to provide an improved hand held shower head and water filter that meets the demanding filtering capacity and temperature requirements of modern water supplies having higher concentrations of toxins therein, and which is versatile in use. And, it is a further particular object of the present invention to provide an improved hand held shower head and water filter having a unitary handle holding filter media therein.

In accordance with one aspect of the present invention, there is provided a hand held shower head and water filter having a unitary, elongated, hollow handle with filter media held therein. The unitary handle and filter may have a filter media, such as non-soluble calcium sulfite inserted herein, either alone or combined with a copper-zinc medium, to allow for the improved treatment of hot shower water, at high flow rates, in a versatile, portable unit, in which the combination handle and filter may be easily removed and replaced.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the accompanying drawings, in which:

FIG. 1 is a perspective view, partially in cross-section, of a preferred embodiment of a hand held shower head and filter assembly of the present invention;

FIG. 2 is an exploded view of the assembly of FIG. 1; and

FIG. 3 is a cross-sectional view taken along line 3—3 of FIG. 1.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an explanation of a novel hand held shower head and filter assembly for use in filtering toxic substances, such as chlorine, from fluids, such as hot water, passing through the assembly of the present invention.

Turning now to the drawings, there shown is a shower head and filter assembly 10, which is secured in or to one end of a flexible fluid conduit 12, as by means of a threaded fastener 13. The other end of the conduit 12 is secured to a faucet or shower arm in a known manner, to carry water to the assembly 10. The assembly 10 includes an elongated, hollow, one-piece or unitary combination handle, body or shell and shower water filter 14. This handle and shower water filter may be constructed in any conventional or known manner, such as extruding, from any acceptable material, such as a high strength plastic or the like. The unitary elongated, hollow, one-piece handle and shower filter 14 forms the handle portion for grasping or holding the assembly 10, as well as the filter portion thereof. An upper portion 16, having an angled shower head 18 is secured at a first or upper threaded end 20 of handle 14, as by means of a curved conduit or element 22. Curved element 22 includes an enlarged, annular end 24 having internal threads 26 formed therein. Threads 26 are adapted to mate with external threads 28 formed on the first or upper end 20, above a flange 30 extending around the handle 14. When secured together, as by threading the body 14 and upper portion 16 together, elements 14 and 16 form the assembly 10, which is capable of containing high-pressure hot water in a shower.

The elongated, hollow handle 14 is preferably formed as a tapering, cylindrical element, with its first or upper end 20 being larger than a second or lower end 32. Lower end 32 includes external threads 34 formed on a smaller diameter extension 36. That is, the lower end 32 is of a smaller diameter than the first or upper end 20. This elongated, tapered handle 14 forms the unitary handle and filter housing of the assembly 10 of the present invention, and includes a fluid inlet formed in extension 36 on which fastener 13 is secured. The inlet is connected to an inner chamber 38, formed in the handle 14. Since the lower end 32 of the handle 14 is smaller in diameter, the lower end of the elongated, inner chamber 38 is also smaller in diameter than the top portion thereof, adjacent flange 30. Filter media 40 is captured in the inner chamber 38 by screens 42, 44, placed at both ends of the inner chamber 38. Additionally, a further screen 46 may be placed in the inner chamber 38 approximately one-half way between the ends to form a two-stage filter. Fluid entering from inlet 30 will, therefore, flow into the inner chamber 38 and pass through the filtering media 40 held within the inner chamber.

In use, when water enters from conduit 12 into the inlet, the water will pass through the lower screen 44, the filter media 40, the central screen 46, further filter media and upper screen 42, through end 20 into conduit 22 in the curved element of the upper portion 16, before exiting through shower head 18.

Screens 42, 44 and 46 in the inner chamber 38 may be permanently or removably secured within the inner chamber, to retain the filter media 40 in place in the first and second stages.

The dechlorination or filtering media 40 held within the housing 14 may consist of any commercially available filter media, but is preferably "ceramic-type calcium sulfite beads", or particles, used alone or mixed with a copper/zinc material, such as disclosed in my U.S. Pat. Nos. 6,016,977 and 6,056,875.

In the present invention, the use of the ceramic-type calcium sulfite beads in combination with the copper zinc, acts synergistically, not only to filter out contaminants from water, and particularly hot shower water, but also to enhance and expedite the shower filtering process, for a longer period of time. Thus, by having more filter media in inner chamber 38, the enhanced effectiveness of the filtering process in the hand held unit of the present invention will be prolonged.

The ceramic-type calcium sulfite beads, alone or combined with copper-zinc, are held within the two stages of the combination handle/filter element 14, and is preferably in approximately equal volumes (50—50).

It, therefore, can be seen that the device of the present invention provides a versatile hand held unit, which can handle increased volumes of hot water. The entire handle may be replaced, and since it carries a larger amount of filter media, without requiring a separate filter unit, to provide the hand held unit of the present invention with a longer life to dechlorinate hot water passing therethrough. This produces savings in the use of energy and materials. Furthermore, by eliminating the separate filter unit, and providing the handle 14 with a narrower head having sealing means 48 therein, less materials are needed, since a separate filter element is not required.

Accordingly, as will be apparent to those skilled in the art, the present invention provides considerable advantages in ease and flexibility of use and for filtering chlorine or other unwanted substances from hot shower water. Particularly, this device provides a unique assembly having an elongated combination handle and filter element that contains a larger amount of filter media for removing chlorine or other substances from hot water during bathing or showering. Furthermore, the handle is less susceptible to leaking. Specifically, the device herein disclosed provides for a simplified combination handle and filter element that may be easily removed and replaced, as needed.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A hand held shower assembly, comprising:

an elongated, hollow body to be held in a hand; the elongated, hollow body having an elongated internal chamber formed therein between a first end and a second end to allow fluid to flow into and out of said elongated, internal chamber;

said elongated, hollow body to be held in a hand being cylindrical, with the first end forming an outlet, and the second end forming an inlet;

filter media held in said elongated, internal chamber by screens in the inlet and the outlet;

the first end and the second end having screw threads formed thereon; and a shower head secured at an angle to the screw threads formed on the first end, and covering the first end down to a flange formed on the elongated, hollow body.

2. The water filter assembly of claim 1, further including a curved internal conduit formed between the shower head and the screw threads formed on the first end.

3. The water filter assembly of claim 2, further including a screen divider in said elongated, internal chamber to divide said filter media into two stages.

4. The water filter of claim 3 wherein said filter media is a mixture of a non-soluble calcium sulfite and a copper-zinc media.

5. The hand held shower assembly of claim 4 wherein said non-soluble calcium sulfite is in the form of beads.

6. The hand held shower assembly of claim 1 wherein said elongated, hollow body and said elongated internal chamber are tapered from the first end to the second end, with the first end being larger than the second end.

7. A hand held shower assembly for removing chlorine from hot shower water, comprising:

an elongated, hollow body having an elongated, internal chamber formed between a larger first open end and a smaller second open end;

screw threads formed on an exterior surface of said elongated, hollow body at said larger first open end and said smaller second open end;

the elongated, internal chamber being tapered so as to narrow from the larger first open end to the smaller second open end;

a separate, upper portion comprised of an angled shower head and a curved conduit secured to said screw threads at said larger, first open end; and filter media held in said elongated, internal chamber by screen elements held adjacent to said larger first open end and said smaller second open end.

8. The hand held shower assembly of claim 7 wherein said elongated, hollow body is tapered.

9. The hand held shower assembly of claim 8 wherein said elongated internal chamber contains two stages of filter media divided by a central screen held in the elongated, internal chamber.

10. The hand held shower assembly of claim 9 wherein said filter media is a non-soluble calcium sulfite and a copper-zinc media.

11. The hand held shower assembly of claim 10 wherein said non-soluble calcium sulfite is in the form of beads.

12. The hand held shower assembly of claim 11 wherein said non-soluble calcium sulfite beads is mixed with a copper-zinc media in approximately equal volumetric portions.

13. A combination hand held shower head assembly and filter for removing chlorine from hot shower water, comprising:

an elongated, tapered, hollow handle to be held in a hand, having an elongated, tapered, internal chamber formed therein;

a first, larger open end of said elongated, tapered, hollow handle, to be held in a hand, having external screw threads formed thereon with a sealing element held therein;

a second, smaller open end of said elongated, tapered, hollow handle to be held in a hand, having external screw threads formed thereon;

the shower head comprised of an upper portion which is angled and has a curved, internal conduit having internal screw threads formed in an internal passage; the shower head being secured to said first, larger open end by said internal screw threads and said external screw threads on said first, larger open end; and filter media held in said elongated, tapered, internal chamber by a pair of screens held in said elongated, tapered, internal chamber adjacent said first, larger open end and said second smaller open end;

and said filter media being internally divided into two stages by a further screen held in said elongated, tapered, internal chamber.

* * * * *